(12) United States Patent
Disner et al.

(10) Patent No.: US 6,193,294 B1
(45) Date of Patent: Feb. 27, 2001

(54) TRUCK TAILGATE ACCESSORY

(76) Inventors: Patrick Disner; Henry Disner, both of 11000 Acoma St, Northglenn, CO (US) 80234

( * ) Notice: Subject to any disclaimer, the term of this patent is extended or adjusted under 35 U.S.C. 154(b) by 0 days.

(21) Appl. No.: 09/130,022

(22) Filed: Aug. 6, 1998

(51) Int. Cl.[7] .................. B62D 33/03; A47B 5/06
(52) U.S. Cl. ............... 296/26.11; 296/57.1; 108/44
(58) Field of Search ............... 296/26.08, 26.11, 296/57.1; 108/44, 156

(56) References Cited

U.S. PATENT DOCUMENTS

| | | | | |
|---|---|---|---|---|
| 2,852,303 | * | 9/1958 | Hopson | 296/26 |
| 2,872,239 | * | 2/1959 | Bowness et al. | 296/26.11 |
| 4,472,639 | * | 9/1984 | Bianchi | 296/26 |
| 4,531,773 | * | 7/1985 | Smith | 296/26 |
| 4,856,840 | * | 8/1989 | Hanley | 296/26 |
| 5,090,335 | * | 2/1992 | Russell | 108/44 |
| 5,483,904 | * | 1/1996 | Kelly et al. | 108/156 |
| 5,533,771 | * | 7/1996 | Taylor et al. | 296/26 |
| 5,575,521 | * | 11/1996 | Speis | 296/57.1 |
| 5,649,731 | * | 7/1997 | Tognetti | 296/26 |
| 5,765,892 | * | 6/1998 | Covington | 296/26 |
| 5,775,759 | * | 7/1989 | Cummins | 296/26 |
| 5,806,907 | * | 9/1998 | Martinus et al. | 296/26.11 |
| 5,823,595 | * | 10/1998 | Tronco | 296/26.03 |
| 5,823,596 | * | 10/1998 | Kulesza | 296/26.08 |
| 5,857,724 | * | 1/1999 | Jarman | 296/26 |
| 5,934,203 | * | 8/1999 | Glass | 108/156 |
| 5,997,067 | | 12/1999 | Shambeau et al. | 296/57.1 |

* cited by examiner

Primary Examiner—D. Glenn Dayoan
Assistant Examiner—Paul Chenevert
(74) Attorney, Agent, or Firm—Ramon L. Pizarro; Edwin H. Crabtree

(57) ABSTRACT

A device for enlarging a cargo area, having sides, of a truck having a tailgate. The device being adapted for mounting on the tailgate of the cargo area, and including a central panel with side edges and ends, one of the side edges being attachable to the tailgate. Attached to the central panel is a pair of end panels that can attach to the central panel and to the sides of the cargo area, so that the cargo area may be enlarged by positioning the tailgate in a substantially horizontal position, positioning the central panel in a substantially vertical orientation relative to the tailgate while the end panels attach to the sides of the cargo area and extend from the sides of the cargo area to the central panel. The structure also allows the end panels to fold under the central panel and between the central panel and the tailgate when not in use. Additionally, the structure allows the central panel to further unfold from the tailgate to form a work surface.

16 Claims, 3 Drawing Sheets

TRUCK TAILGATE ACCESSORY

BACKGROUND OF THE INVENTION (a) Field of the Invention

This invention generally relates to a device for extending the useful space of the bed of a truck and for creating an enlarged work surface from the bed of the truck. More particularly, but not by way of limitation, to a folding workbench and truck bed extension which attaches to the tailgate of a truck, and cooperates with the tailgate to extend the side walls of the bed of the truck and unfolds to provide a large flat work area extending from the tailgate of the truck.

(b) Discussion of Known Art

Pickup trucks, as well as small trailers and the like, which include a cargo area with a tailgate for unloading have long been favored for their versatility in carrying small loads of materials and tools. Many times, however, the pickup bed, or trailer cargo area, need to be temporarily enlarged. Additionally, it is often necessary to provide a work surface at the job site. Therefore, it would be advantageous to provide a device that allows enlargement of the cargo area of a pickup truck, trailer or the like, while also providing a device that can be used as a work surface at the job site.

There have been many approaches at providing devices that allow enlargement of the cargo or area of a truck or the like. For example, in U.S. Pat. No. 2,852,303 to Hopson teaches the use of a sliding box which mounts on tracks that attaches to the bed of the truck. While the Hopson device provides a means for enlarging the cargo area by extending the box from the bed of the truck, it requires extensive modifications to provide for the track mechanism. Additionally, it is disadvantaged in that it really does not provide for means for providing a work surface once the truck bed has been unloaded.

A known device which the is directed at the need to provide the work surface at a job site is taught in U.S. Pat. No. 4,856,840 to Hanley. The Hanley device attaches over the tail gate of the pickup truck and provides an anchoring mechanism that slips under the trailing edge of the bed of the truck to hold the device over the tail gate. While the Hanley device provides a simple mechanism for attaching an enlarged work surface over the tail gate, it does little for enhancing the cargo carrying capabilities of the truck.

Still another device for providing a work surface at a job site is taught and U.S. Pat. No. 5,090,335 to Russell. The Russell device suffers from the same limitations as the Hanley device in that it does not provide for enhancement of the cargo area. Additionally, like the Hanley device, the Russell device is not safe for use while the vehicle is moving or transporting materials.

Other devices which provide work surfaces but do not enhance the cargo carrying capabilities of the truck are taught in U.S. Pat. Nos. 5,333,771 to Taylor et al., 5,575,521 to Speis, and 5,649,731 to Tognetti.

Thus, there remains a need for a device which can be used to enlarge or enhance the use of the cargo area of pickup trucks, trailers or the like, while also serving to provide a work surface once at the work site.

There remains a need for a device which can enlarge or enhance the use of the cargo area of a pickup truck, trailer or the like, without requiring the use of rollers, tracks, or other attachments to the bed of the truck or trailer itself.

There remains a need for a device that can be attached to the cargo area of a truck and used for carrying materials from one place to another.

Still further, there remains a need for a simple device which can enhance the cargo carrying capabilities of the truck or trailer or the like which will not take up a great deal of space within the truck itself and will not require great modifications of the cargo area.

SUMMARY

It has been discovered that the problems left unanswered by the known art can be solved by providing an accessory that mounts on the tailgate of a truck, trailer or other cargo carrying device with a tailgate, the accessory includes:

a) a central panel having an attachment for supporting the central panel from the tailgate; and b) a pair of end panels pivotally attached to the central panel, so that the end panels may fold under the central panel and fit next to the central panel when not in use, the end panels can then unfold form the central panel and connect to the sides of the cargo area to define an enlarged cargo area, and then further unfold from the central panel to form a work surface.

In a highly preferred embodiment of the invention, the central panel is generally rectangular in shape, and includes side edges and ends. One of the side edges will hingedly attach to the tailgate. The end panels are hingedly attached to the ends of the central panel, so that the end panels may be folded under the central panel and stored under the central panel, between the central panel and the tailgate, when not in use.

It is contemplated that the disclosed invention will be particularly useful in cooperation with the tailgate found in trucks having a bed with a cargo area that is defined by vertical sides that are closed off by a tailgate. In a highly preferred embodiment of the invention, the end panels will include an attachment mechanism that will allow the end panels to attach to the sides of the cargo area adjacent to the tailgate. Thus, with this embodiment the user will be able to enlarge the carrying capacity of the cargo area by placing the tailgate in a horizontal position and then raising the central panel and unfolding the end panels, so that the end panels attach to the sides of the cargo area while supporting the central panel in a generally vertical position relative to the tailgate.

It is further contemplated that the disclosed invention may be further serve as a work surface at the work site. It is contemplated that, with the tailgate in a substantially horizontal position, the central panel will be unfolded to a substantially horizontal position, away form the tailgate to form an extension from the tailgate. Additionally, the end panels will then be unfolded from the central panel to a position that is generally parallel to the central panel, so that the end panels act as an extension to the central panel.

It is further contemplated that the disclosed invention may be used with detachable, adjustable legs. The legs may attach to the central panel and a support mechanism may be incorporated between the end panels and the end panels to hold the central panel and the central panel in a generally co-planar, horizontal relationship to one another. Additionally, it is contemplated legs may also be paced under the end panels for applications where heavy objects are to be placed over the invention.

Thus, it will be understood that the disclosed invention allows the cargo carrying area to be extended by providing an extension to the sidewalls of the bed of the truck. Additionally, the disclosed invention may be used to provide an enlarged work surface extending from the bed, and more particularly, extending from the tailgate used with the cargo area or bed of the truck.

It will be understood that the disclosed invention eliminates the need to incorporate tracks, wheels, or other similar means onto the bed of the truck to provide for an extension of the cargo carrying area.

Still further, it will be understood that the disclosed invention provides a simple cargo area extension and work area extension which can collapse next to the tailgate of the truck, and thus minimize the cargo area taken up by the device.

It should also be understood that while the above and other advantages and results of the present invention will become apparent to those skilled in the art from the following detailed description and accompanying drawings, showing the contemplated novel construction, combinations and elements as herein described, and more particularly defined by the appended claims. It should be clearly understood that changes in the precise embodiments of the herein disclosed invention are meant to be included within the scope of the claims, except insofar as they may be precluded by the prior art. dr cl DRAWINGS The accompanying drawings illustrate preferred embodiments of the present invention according to the best mode presently devised for making and using the instant invention, and in which:

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
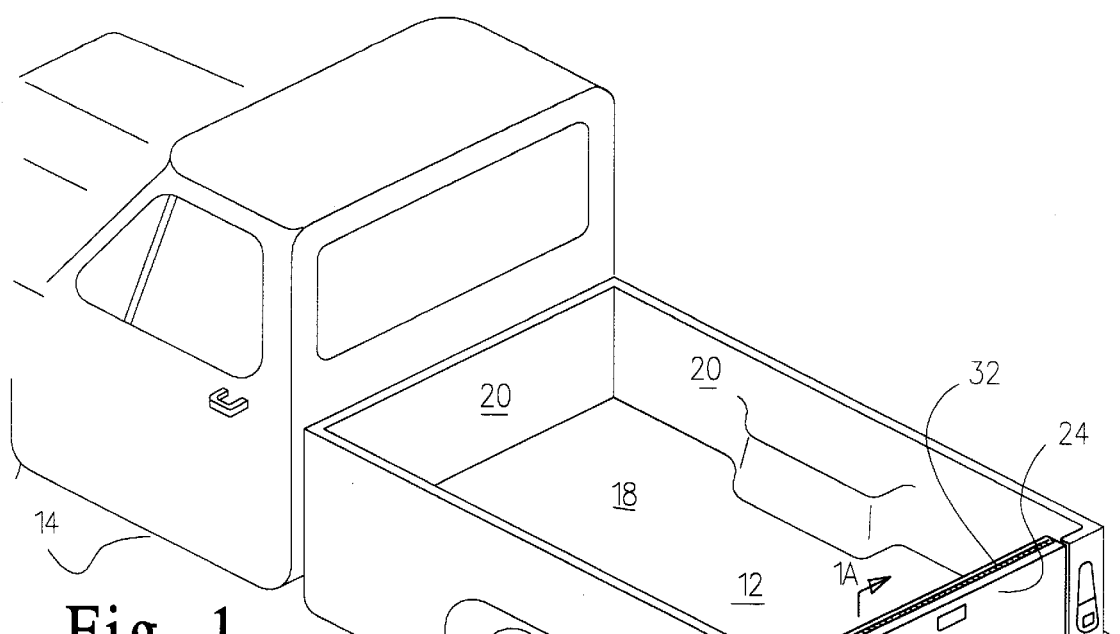
FIG. 1 is a perspective view of a highly preferred embodiment of the invention, the view illustrating the invention attached to the tailgate of a truck. The invention being in a collapsed position.
Figure 2:
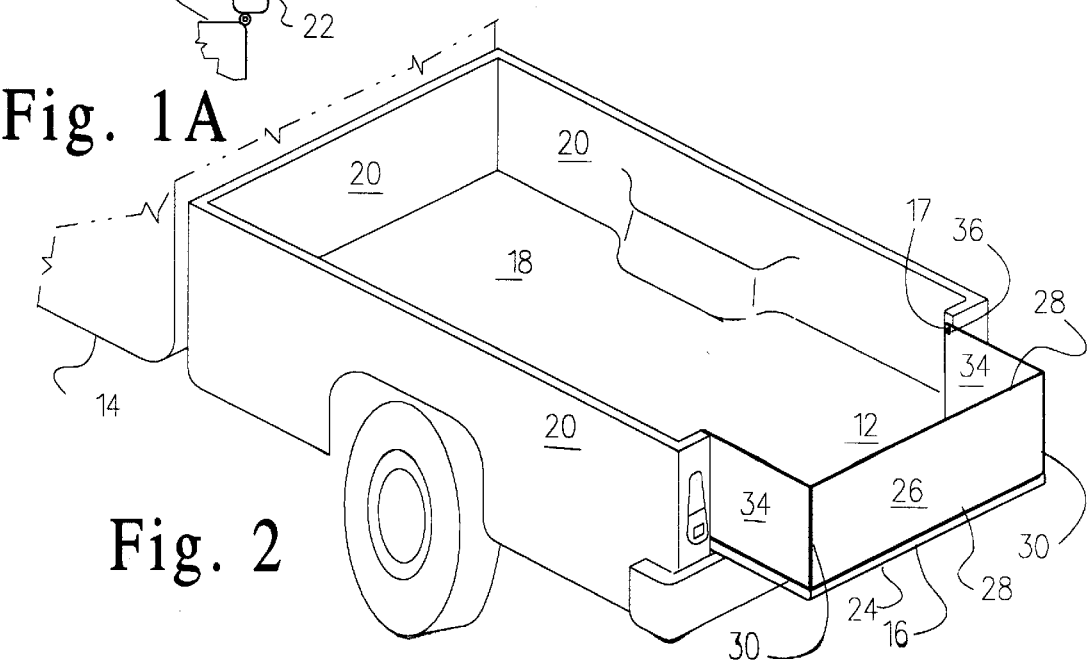
FIG. 2 is a perspective view of a highly preferred embodiment of the invention while serving as an extension of the cargo area.
Figure 3:
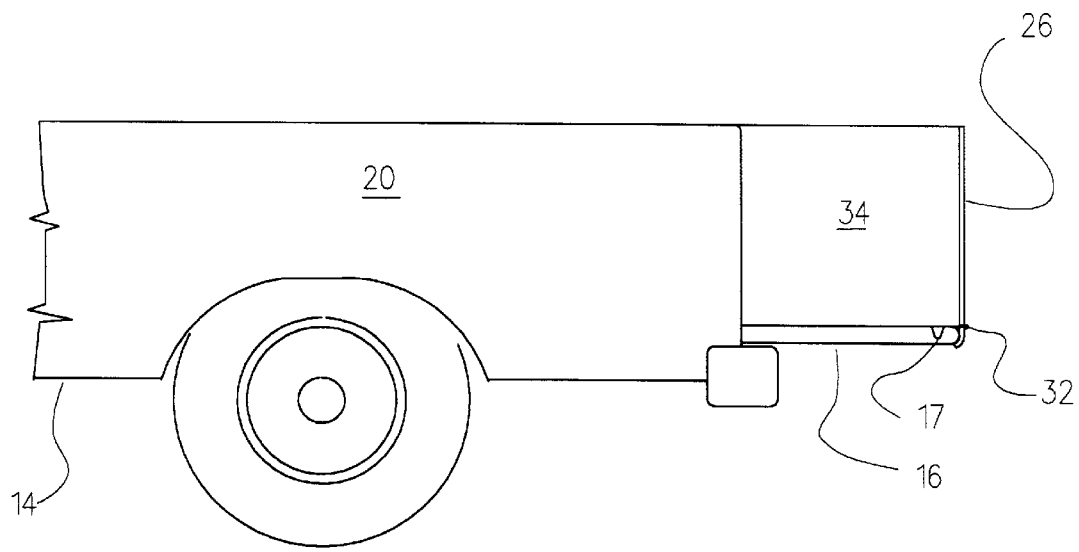
FIG. 3 is a side view of the invention shown in the position shown in FIG. 2.

Turning now to FIGS. 1 and 2, where a preferred embodiment of the invention, referred to herein as a truck tailgate accessory or device 10 for enlarging the cargo area 12 of the truck 14. The device 10 has been shown mounted on the tailgate 16 of the cargo area 12, which is defined by the area enclosed by a bed 18 having substantially vertical sides 20 and the tailgate 16 when in a substantially vertical position extending between the sides 20. The tailgate 16 includes a hinged side edge 22 that is hingedly attached to the bed 18 of the truck and a free side edge 24 that is generally parallel to the hinged side edge 22, the device 10 being adapted for mounting on the free side edge 24 of the tailgate 16.

Figure 1A:
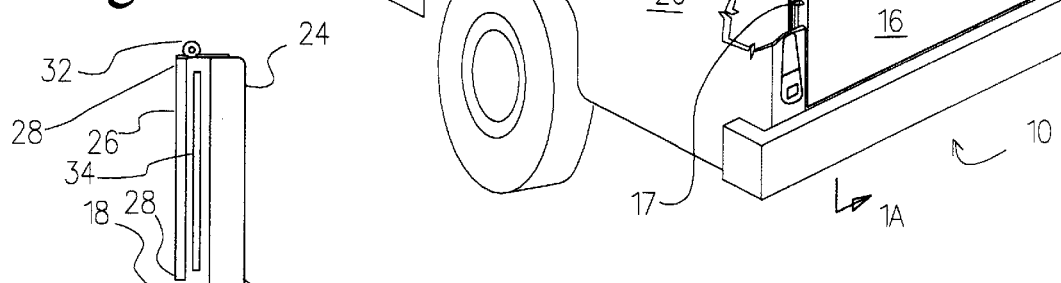
FIG. 1A is a section taken as indicated from FIG. 1 and illustrating the stacking of the central panel over the end panels when the device is not in use.

FIGS. 1 and 1A illustrate the stowage of the device 10 when not in use. When not in use, the device 10 simply rests against the tailgate 16 in a substantially parallel manner directly over the tailgate 16. It is contemplated that the device 10 may be held in this position against the tailgate 16 by gravity or by the use of a latch type mechanism or other known means for holding the device 10 against the tailgate 16. The tailgate being held in the upright position by means of a well known latch mechanism 17 near the sides 20 of the cargo area 12 of the truck 14.

Turning now to FIG. 2 it will be understood that the device 10 includes a central panel 26 having side edges 28 and ends 30. One of the side edges 28 includes means 29 for hingedly attaching the central panel directly to the free side edge 24 of the tailgate 16. In a highly preferred embodiment of the invention these means for attaching the central panel 26 to the tailgate 16 includes a long hinge 32 attached by means of fasteners welds or the like near the inner surface of the tailgate 16, the inner surface of the tailgate being the surface which faces the cargo area when the tailgate 16 is in the raised or substantially vertical position.

Also shown on FIG. 2 is that a preferred embodiment of the device 10 includes a pair of end panels 34 which are also preferably hingedly attached, by means of hinges 35, to the ends 30 of the central panel 26. A highly preferred embodiment of the invention includes end panels 34 with means 36 for attachment to the sides 20 of the cargo area 12. In a highly preferred embodiment of the invention these means 36 for attachment to the sides 20 of the cargo area 12 include a latch mechanism which resembles the latch mechanism 17 found on the tailgate 16 and which allows the tailgate to be closed in its substantially upright position. These latch mechanisms are well known and found in all trucks with tailgates, and thus will not be discussed in greater detail herein. The means 36 may be a mechanism which cooperates with the existing tailgate closure latch mechanism typically found on the truck or may include a latch mechanism which simply connects and holds the end panels 34 against the sides 20 of the cargo area 12.

To use the device 10 to extend the cargo area 12, one simply lowers the tailgate 16, placing it in a substantially horizontal position as shown on FIGS. 2 through 6. One then raises the central panel 26 to a substantially vertical position, as shown on FIGS. 2, 3, and 5. The end panels 34 may then be unfolded from under the central panel 26, from between the central panel 26 and the tailgate 16. The end panels 34 are then extended and attached to the sides 20 of the cargo area 12 through the latch mechanism 36 on the sides 20 of the cargo area 12. It is important to note that while it is contemplated that the end panels 34 connect to the sides 20 through the latch mechanism 36, it is also contemplated that other means or links may be used to connect the end panels 34 to the sides 20.

Once the end panels 34 have been attached to the sides 20, the end panels 34 together with the central panel 26 in effect extend the cargo area 12 to include the area now enclosed by the sides 20, the end panels 34, and the central panel 26, and supported on the bottom by the bed 18 and the tailgate 16.

Figure 4:
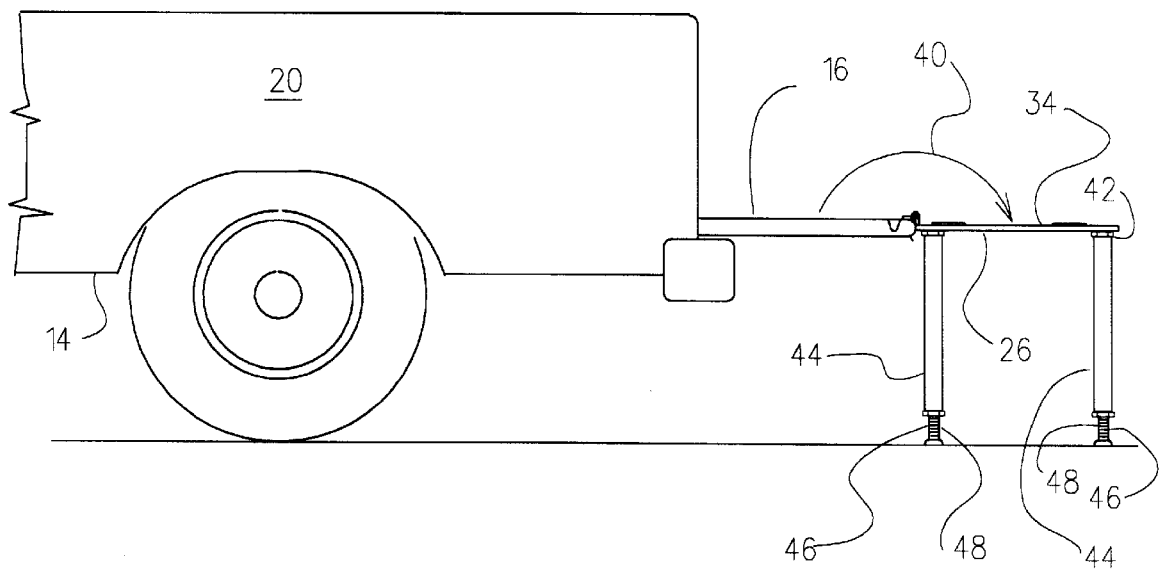
FIG. 4 is a side view of the invention used to form a generally horizontal, flat work area.
Figure 6:
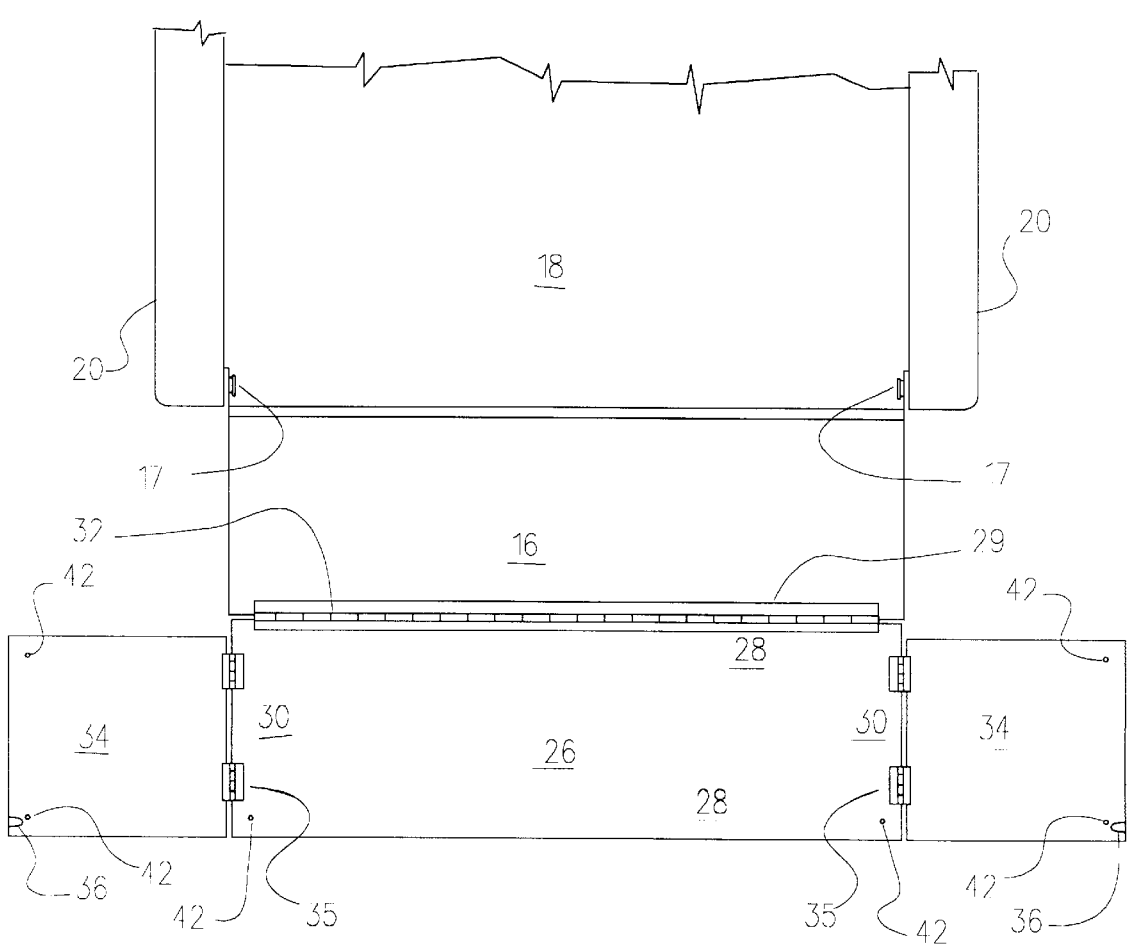
FIG. 6 is a top, plan view of the embodiment shown in FIG. 4, and in the position shown in FIG. 4.

Turning now to FIGS. 4 and 6 it will be appreciated that the means for hinged attachment of the central panel 26 to the tailgate 16 includes a hinge 32 that allows approximately 180 degrees of motion of the central panel 26 relative to the free side edge 24 of the tailgate 16 as indicated by arrow 40 on FIG. 4. By allowing approximately 180 degrees of motion of the central panel relative to the tailgate 16, one enhances the usefulness of the device 10 by allowing the device to convert to a work surface, as shown on FIG. 4. As can be understood from FIGS. 4 and 6, it is also contemplated that the end panels 34 be attached to the central panel 26 by means of hinges which allow at least 180 degrees of rotation of the end panels relative to the central panel 26, allowing the end panels 34 to swing to a position that is substantially coplanar with the central panel 26 while extending away from the central panel 26.

Figure 5:
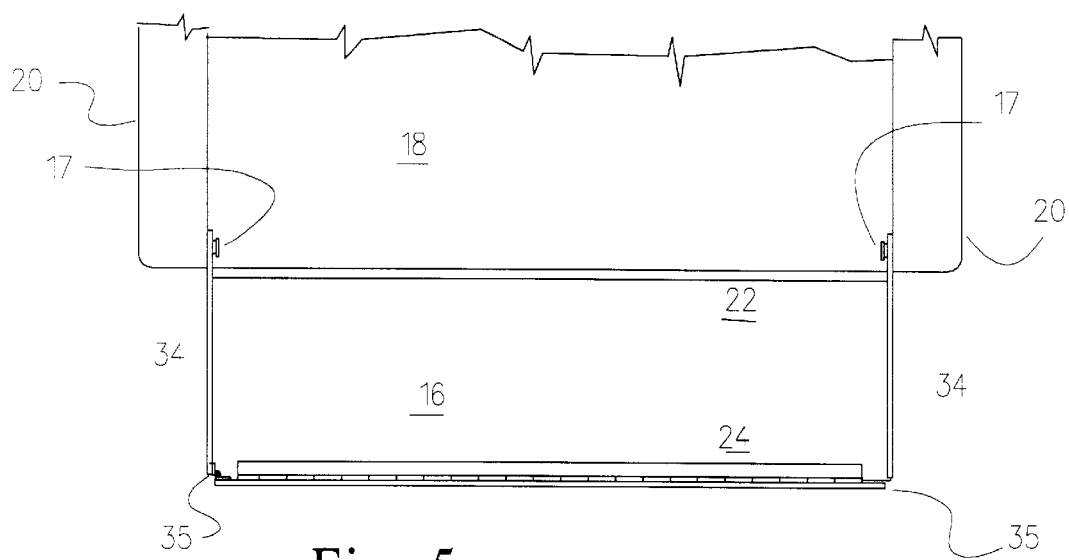
FIG. 5 is a top, plan view of a preferred embodiment of the invention in the position shown in FIG. 3.

In the preferred embodiment shown on FIGS. 4 through 6, the central panel 26 and the end panels 34 include means 42 for accepting removable legs 44. In a preferred embodiment of the invention these means for accepting the removable legs include a hole for a fastener that attaches to the legs or a threaded hole which accepts the removable leg 44.

Also illustrated in FIG. 4 is that the legs 44 will preferably include means 46 for adjusting the length of the legs 44. In a preferred embodiment of the invention these means for adjusting the length of the legs 44 include a threaded section 48 which allows extension of the lower portion of the legs 44.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A device for enlarging a cargo area of a truck and providing a horizontal work surface, the cargo area being defined by a bed having substantially vertical sides and a tailgate extending between the sides, the device being adapted for mounting on the tailgate of the cargo area, the device also serving for providing a work surface extending from the tailgate of the truck, the device comprising:
    a central panel having side edges and ends, one of the side edges having means for attachment of said central panel to the tailgate and includes means for accepting removable legs; and
    a pair of end panels having means for attachment to the central panel and further having means for attachment to the sides of the cargo area, so that the cargo area may be enlarged by positioning the tailgate in a substantially horizontal position and positioning said central panel in a substantially vertical orientation relative to the tailgate while said end panels attach to the sides of the cargo area and extend from the sides of the cargo area to said central panel, and so that the end panels may fold under the central panel and between the central panel and the tailgate when not in use, and so that the central panel may further unfold from the tailgate to form a work surface.

2. A device according to claim 1 wherein said means for attachment of said central panel to the tailgate comprises a hinge means.

3. A device according to claim 1 wherein said end panels are substantially rigid.

4. A device according to claim 3 wherein each of said end panels is hingedly attached to one of the ends of the central panel, so that the end panels may fold under the central panel and between the central panel and the tailgate when not in use, and so that the end panels unfold from under the central panel and attach to the sides of the cargo area to extend the cargo area, and then further unfold from the central panel to form a work surface.

5. A device according to claim 4 wherein each of the end panels includes means for accepting removable legs, so that when the central panel is unfolded away from the tailgate to a generally horizontal position that is generally coplanar with the tailgate, the end panels may be unfolded away from the central panel to a generally horizontal position that is generally coplanar with the tailgate and the central panel and supported by removable legs.

6. A device for enlarging a cargo area of a truck and for providing a horizontal work surface extending from the cargo area, the cargo area being defined by a bed having substantially vertical sides and a tailgate extending between the sides, the tailgate having a side edge that is hingedly attached to the bed of the truck and a free side edge that is generally parallel to the hinged side edge, the device being adapted for mounting on the free side edge of the tailgate, the device comprising:
    a central panel having side edges and ends, one of the side edges having means for hinged attachment to the free side edge of the tailgate and means for accepting removable legs; and
    a pair of end panels pivotally attached to the central panel and having means for attachment to the sides of the cargo area, the end panels being adapted for
    stowage between the central panel and the tailgate, so that the end panels may fold under the central panel and between the central panel and the tailgate when not in use, and so that the end panels unfold from under the central panel and attach to the sides of the cargo area to extend cargo area, and then further unfold from the central panel to form a work surface.

7. A device according to claim 6 wherein said means for attachment of said central panel to the tailgate comprises a hinge means.

8. A device according to claim 7 wherein said end panels are substantially rigid.

9. A device according to claim 8 wherein each of said end panels is hingedly attached to one of the ends of the central panel, so that the end panels may fold under the central panel and between the central panel and the tailgate when not in use, and so that the end panels unfold from under the central panel and attach to the sides of the cargo area to extend cargo area, and then further unfold from the central panel to form a work surface.

10. A device according to claim 9 wherein each of the end panels includes means for accepting removable legs, so that when the central panel is unfolded away from the tailgate to a generally horizontal position that is generally coplanar with the tailgate, the end panels may be unfolded away from the central panel to a generally horizontal position that is generally coplanar with the tailgate and the central panel and supported by removable legs.

11. A device according to claim 10 and further comprising removable legs, the removable legs including height adjustment means.

12. A method for enlarging a cargo area of a truck and providing a horizontal work surface extending from the cargo area, the cargo area being defined by a bed having substantially vertical sides and a tailgate extending between the sides, the method comprising:
    providing a device being adapted for mounting on the tailgate of the cargo area, the device comprising:
        a central panel having side edges and ends, one of the side edges having means for attachment of said central panel to the tailgate and includes means for accepting removable legs; and a pair of end panels having means for attachment to the central panel and further having means for attachment to the sides of the cargo area;

enlarging the cargo area by positioning the tailgate in a substantially horizontal position and attaching said central panel in a substantially vertical orientation relative to the tailgate while said end panels attach to the sides of the cargo area and extend from the sides of the cargo area to said central panel; and further creating a work surface by providing a pair of detachable legs, and extending the central panel away from the tailgate and away from the cargo area in a generally parallel manner from the tailgate and attaching the legs to the central panel to add support to the central panel.

13. A method according to claim 12 wherein each of said end panels is hingedly attached to one of the ends of the central panel, so that the end panels may fold under the central panel and between the central panel and the tailgate when not in use, the method further comprising unfolding the end panels from the central panel to a position that is generally parallel to the extended central panel to form a work surface that includes the central panel and the pair of end panels.

14. A method according to claim 13 and further comprising providing each of the end panels with means for accepting removable legs; and attaching legs to the end panels when the central panel is unfolded away from the tailgate.

15. A method according to claim 13 and further comprising providing means for adjusting the length of the removable legs, and adjusting the length of the removable legs to adjust the incidence of the central panel relative to the tailgate.

16. A method according to claim 14 and further comprising providing means for adjusting the length of the removable legs on the end panels, and adjusting the length of the removable legs on the end panels to adjust the incidence of the end panels relative to the central panel.

\* \* \* \* \*